(12) United States Patent
Kassel

(10) Patent No.: US 7,983,796 B2
(45) Date of Patent: Jul. 19, 2011

(54) ENERGY EFFICIENT METHOD OF MONITORING AND CONTROLLING AN HVAC SYSTEM

(76) Inventor: Edward A. Kassel, Menasha, WI (US)

(*) Notice: Subject to any disclaimer, the term of this patent is extended or adjusted under 35 U.S.C. 154(b) by 298 days.

(21) Appl. No.: 12/442,425

(22) PCT Filed: Sep. 21, 2007

(86) PCT No.: PCT/US2007/079130
§ 371 (c)(1),
(2), (4) Date: Mar. 23, 2009

(87) PCT Pub. No.: WO2008/036878
PCT Pub. Date: Mar. 27, 2008

(65) Prior Publication Data
US 2010/0010679 A1  Jan. 14, 2010

Related U.S. Application Data

(60) Provisional application No. 60/826,417, filed on Sep. 21, 2006.

(51) Int. Cl.
G05D 23/00 (2006.01)
(52) U.S. Cl. .......... 700/278; 700/291; 700/295
(58) Field of Classification Search .......... 700/276, 700/278, 291, 295
See application file for complete search history.

(56) References Cited

U.S. PATENT DOCUMENTS

| | | |
|---|---|---|
| 2004/0024483 A1 | 2/2004 | Holcombe |
| 2004/0034484 A1 | 2/2004 | Solomita et al. |
| 2005/0033707 A1 | 2/2005 | Ehlers et al. |
| 2005/0156052 A1 | 7/2005 | Bartlett et al. |
| 2005/0234596 A1* | 10/2005 | Rietschel .......... 700/276 |
| 2005/0281030 A1 | 12/2005 | Leong et al. |
| 2006/0032245 A1 | 2/2006 | Kates |

OTHER PUBLICATIONS

U.S.P.T.O., International Search Report and Written Opinion, dated Mar. 13, 2008 regarding PCT/US07/79130.

* cited by examiner

Primary Examiner — Ryan A Jarrett
(74) Attorney, Agent, or Firm — Patzik, Frank & Samotny Ltd.

(57) ABSTRACT

A method of monitoring and controlling an active environmental control system to impose energy efficient use of the system. The method includes the steps of monitoring a calling device for a change in calling data, time and date stamp the change in calling data, detecting a change in status of a plurality of physical sensors located within the system, wherein the state of each sensor represents a condition of the environment in which the system resides, time and date stamp the change in status of the plurality of physical sensors, measuring the temperature of a plurality of temperature locations within the system, time and date stamp the measured temperature of the temperature locations, storing for an extended period the calling data, the status change of the physical sensors and the measured temperature of the plurality of temperature locations, together with the respective time and date stamp, in a memory of the system, filtering the calling data, the physical sensors status change and the measured temperature for a system control trigger to identify system control trigger data, extracting a probability decision, to predict a direction of trend, by comparing recent system control trigger data with prior recorded system control trigger data, weighting the system control trigger data, based on the probability decision that the data is causing the output event trigger, in order to effect a desired change in output, and controlling the system based on the weighted system control trigger data.

16 Claims, 3 Drawing Sheets

ENERGY EFFICIENT METHOD OF MONITORING AND CONTROLLING AN HVAC SYSTEM

CROSS-REFERENCE TO RELATED APPLICATIONS

This application claims the benefit of U.S. Provisional Application No. 60/826,417, filed Sep. 21, 2006.

FIELD OF INVENTION

An intelligent method for monitoring and controlling active heating/ventilating and air conditioning equipment for the purpose of energy savings and, in particular, using current and prior system performance to anticipate necessary system control in order to obtain a desired energy efficiency.

BACKGROUND OF THE INVENTION

The prior art includes heating/ventilation and air conditioning (HVAC) systems which typically include a furnace or boiler to heat air or water. The system includes a means of conveying the heat to other locations. The conveying means is typically ductwork for a furnace and piping for a boiler. The air conditioning half of the system typically includes a compressor, condenser, evaporator and a metering device. A thermostat is coupled to a controller for controller the above components of the system.

SUMMARY OF THE INVENTION

The present invention relates to an intelligent method for monitoring and controlling an active environmental control system. The environmental control system of the present invention may include any one or more components traditional associated with an HVAC system. For example, the system of the present invention may include the ability to control the temperature of an environment such as a residential home or other building. The temperature control may include control of the warmth or cooling of the environment. The system may include controlling the humidity. Additionally, the system may include controlling air quality such as via a mechanical filter or electrostatic filtering. In one embodiment, the system may include controlling the ratio of outside air introduced to the air within the building.

To capture active system performance parameters through monitoring the time increments and instances of occurrence of the control currents used to activate devices or systems, and by Bayesian inference analysis, form an overarching layer of control or plurality of control, for the purpose of forcing energy saving of such power consuming devices or systems. Further, to store, annotate and report locally and remotely, the operational condition, efficiency and level of said equipment's performance.

Bayesian inference uses a numerical estimate of the degree of belief in a hypothesis before evidence has been observed and calculates a numerical estimate of the degree of belief in the hypothesis after evidence has been observed. Bayesian inference usually relies on degrees of belief, or subjective probabilities, in the induction process and does not necessarily claim to provide an objective method of induction. Nonetheless, some Bayesian statisticians believe probabilities can have an objective value and therefore Bayesian inference can provide an objective method of induction.

Using, software control, inference methodology and immediate wireless transmission of operational data, this invention uses input from both internal and external sensors to analyzes and act on programmed associations between them; recording, conveying and coordinating an output such that said output forms an overarching layer of system control that is master to any other device or system normally employed inside the operational electrical path between them and the device being controlled. Applying such a process, by its core definition, therefore dictates (forces) automated energy savings by intervening and controlling a device's electrical signal (call) for activation or operation at the electrical (or physical), point that is closest to it. Depending on the set program parameters entered, any level or amount of energy savings can be set and any device's or system's consumption of energy that is/are upstream with respect to this invention, will effectively be limited, in spite of any other downstream call for its activation.

The following types of data will be accumulated by the DARM based on input activity, output current flow and other operational conditions:
  a) Accumulation of input events
  b) Duration of input events
  c) Accumulation of output current flow events
  d) Accumulation of interrupted output current events
  e) Duration of output current flow events
  f) Battery life hours
  g) Events occurring within set time periods
  h) Grouping of events with set time periods
  i) Accumulation of loss of primary power events
  j) Duration of loss of primary power events
  k) Temperature at set time periods
  l) Output AC Current
  m) Input sources voltage Data will be able to be kept on-board in the form of event records for a planned accumulation of 10 years before rollover or cleared manually through a counter clearing action.

The present invention therefore provides a method of monitoring and controlling an active environmental control system to impose energy efficient use of the system. The method includes the steps of monitoring a calling device for a change in calling data, time and date stamp the change in calling data, detecting a change in status of a plurality of physical sensors located within the system, wherein the state of each sensor represents a condition of the environment in which the system resides, time and date stamp the change in status of the plurality of physical sensors, measuring the temperature of a plurality of temperature locations within the system, time and date stamp the measured temperature of the temperature locations, storing for an extended period the calling data, the status change of the physical sensors and the measured temperature of the plurality of temperature locations, together with the respective time and date stamp, in a memory of the system, filtering the calling data, the physical sensors status change and the measured temperature for a system control trigger to identify system control trigger data, extracting a probability decision, to predict a direction of trend, by comparing recent system control trigger data with prior recorded system control trigger data, weighting the system control trigger data, based on the probability decision that the data is causing the output event trigger, in order to effect a desired change in output, and controlling the system based on the weighted system control trigger data.

While the main design and focus of the present invention is HVAC compressor control, the present invention finds use in other applications. For example, this invention may also be used in the following applications:

1. as an energy saving monitor for independently owned rental units, properties where access by owners and energy sources are not part of a combined infrastructure arrangement.
2. monitoring living conditions for confirming a healthy environment, such as assisted living environment.
3. predicting the efficiency in the design of an existing or new building. The invention being capable of maximizing the efficiency of the building based on the actual or predicted utilization by its occupants.

DETAILED DESCRIPTION OF THE INVENTION

Figure 1:
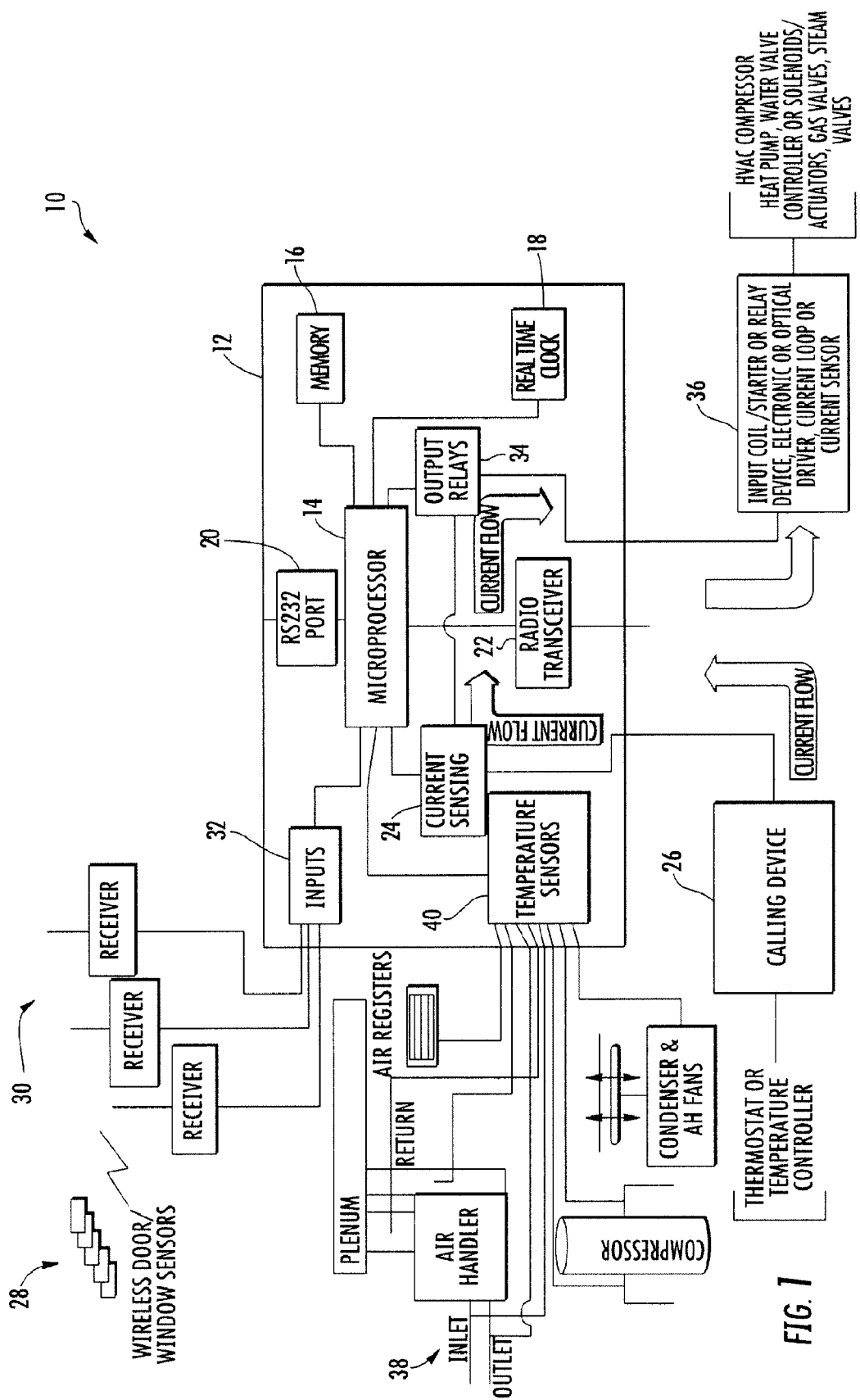
FIG. 1 is a functional block diagram of one embodiment of the present invention, including a controller.

FIG. 1 is a functional block diagram of one embodiment of a system 10 in accordance with the present invention. A controller 12 is shown to include a microprocessor 14 and memory 16 for carrying out the steps of the program residing in the memory. In one embodiment, the memory includes embedded software to provide software control to the various interfaces to the controller. A real time clock 18 is provided. The RTC 18 is a key factor in keeping all data gathered valid and useful within the record format. One task of the RTC includes providing date and time stamp information as will be appreciated from the description herein. An RS-232 port 20 is included and represents various interfaces. For example, the port may provide the ability to interface with a remote personal computer, personal digital assistant (PDA) or similar device, to provide capability to upload or download data. In addition, the port may accommodate a BLUETOOTH® interface. The BLUETOOTH® interface may provide for inter-device communication. Still further, the port may provide the ability to interface with temperature sensors.

The system further includes a radio transceiver 22 coupled to the microprocessor, input relays 24 coupled between a calling device 26 (e.g., a thermostat, temperature controller, or the like) and the microprocessor, the input relays including current sensing. Closure sensors 28 are located at various locations including door and windows. The closure sensors may be a wireless type and coupled to the receivers 30. The receivers are in turn coupled to an input interface 32. Output relays are coupled to the microprocessor and various loads 36. The loads may include an HVAC compressor, heat pump, water valve controller, water valve solenoids, water valve actuators, gas valves, steam valves, and other loads traditionally associated with an HVAC system. The output relays may also include current sensing of the various loads, whereby the microprocessor may monitor the current of the respective load.

Pluralities of temperature sensors 38 are located at various locations throughout the system and building. For example, the temperature locations include an air register, an air return input at a furnace, an air output at the furnace, a plenum of the furnace, a compressor, cold or hot liquid transfer pipe, and a condenser and air handler fans. The temperature sensors are coupled to the microprocessor via a sensor interface 40. While discrete sensor lines are shown coupled to the sensor interface, it will be appreciated that several (for example, six) temperature sensors may be provided via a 1-wire serial bus.

Figure 2:
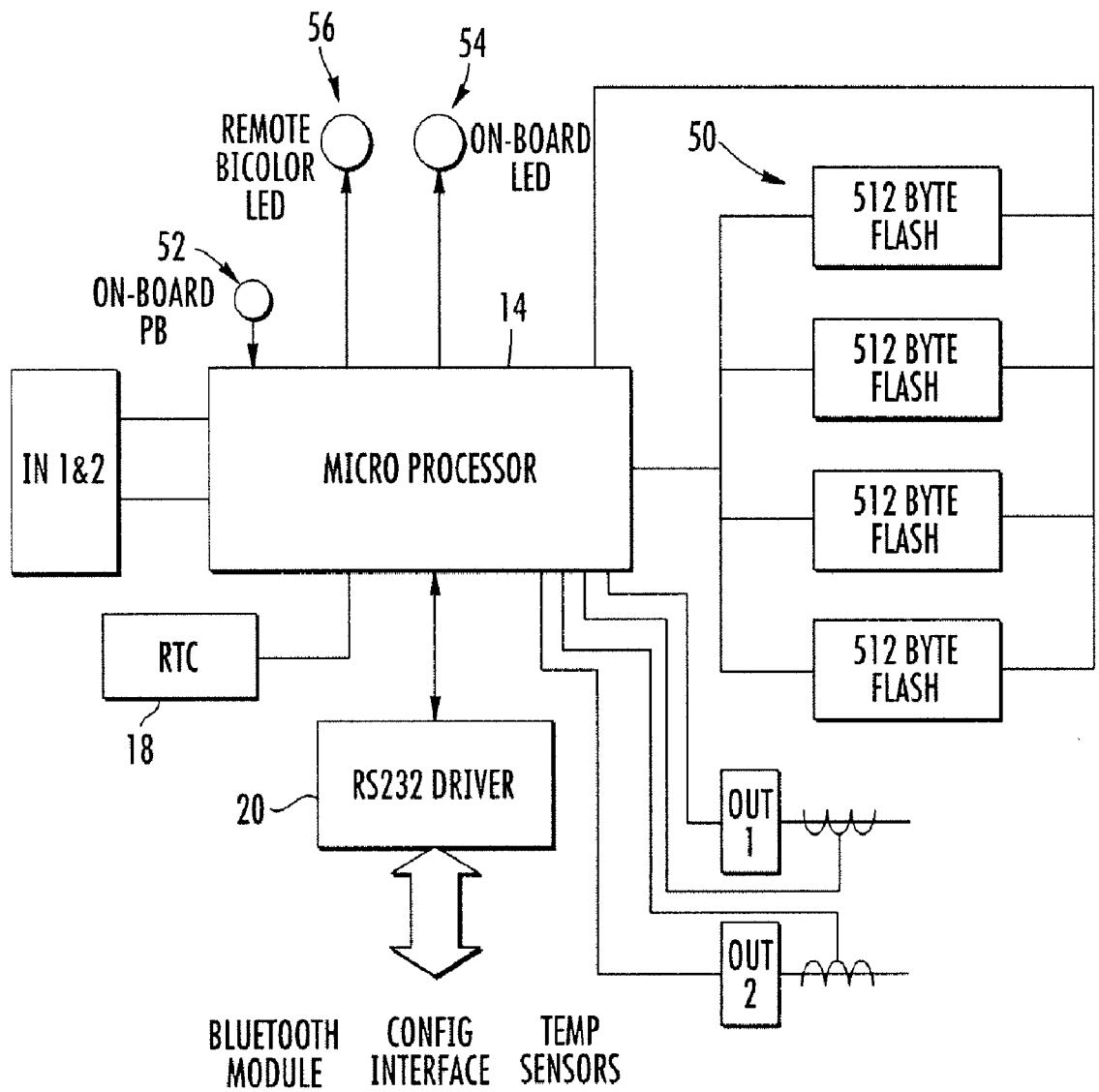
FIG. 2 is a functional block diagram of another embodiment of the controller of FIG. 1.

The controller's function is to sense transitions and changes at its inputs and outputs and both store and transmit that information to other devices and to PC applications. Depending on how it is configured/programmed during initial setup, it will gather, organize, store and distribute relational data surrounding the occurrences of said changes. The controller provides visual feedback through an external indicator LED and through a BLUETOOTH® wireless link to a PC application. Record information that is a compilation of events is time-date stamped and depending on the hardware configuration, stored for an extended period of time in on-board memory. For example, the record information may be stored for several years, and in one embodiment is stored for up to 10 years. Each controller module has the ability to function independently or in coordination with other BT devices as part of a network controlled outside of the control of the embedded software. A block diagram of another embodiment of the controller is shown in FIG. 2. The controller includes flash memory 50 which may be reprogrammed via a built-in boot loader allow fast transfer of program via the BLUETOOTH® interface. The controller includes various interfaces, such as on-board push button switch 52 that functions as a master reset and resets all event memory. An event may be defined as a condition with associated time/date stamp and which is stored in memory. A first on-board LED 54 provides an indication that the controller is healthy, with flashes tied to program operation. It may also flash to indicate a complete master clear. A second on-board LED may be used to indicate communication with a remote device. A first remote LED 56 provides a power on indication. Other off-board LEDs may display input and output operational conditions or display timer and output/fault conditions. The software may be programmed to drive various input and output I/O to interact with certain items, including the serial RS-232 interface, on-board LEDs, Input signals (In-1 and In-2), output relays (Out-1 and Out-2), serial 1 wire temperature sensor network, BLUETOOTH® dauthter-board serial interface and board mounted micro push button switch 52. Embedded software will conduct and interpret an AT-type command set over and through the KC Wirefree BLUETOOTH® daughter board to interface to a third party software application on the other side of the BLUETOOTH® serial link as part of normal operation. The embedded software will also communicate and interact with a third party configuration and test application over its RS-232 port connection during configuration or normal operation.

The controller has four basic modes of operation. An operational mode is the condition that the controller will be in the vast amount of its lifetime. During this mode, the controller will perform several different defined functions as it gathers, stores and manipulates the conditional data it is collecting as it occurs as part of an event. In a flash programming mode, the program on the controller is replaceable over the BT connection that is enacted from a SW application located on a PC, communicating over the BT connection. An on-board boot-loader program will facilitate the process. In a dormancy mode, in the event that system power is lost, normal operation will cease except that if an RTC is provided, the duration of the outage will be counted and stored as an event. In the configuration mode, all of the variables and fixed "switches" that are used to control the controller features are allowed to be retrieved and changed through serial bus communication. Setting of the RTC, clearing memory, serialization and naming, for instance, can all be accomplished using a configuration utility software running as a PC application.

The following is a list of certain system features in one embodiment of the present invention. In particular, the controller embedded program monitors, controls or coordinates the following:

1. Inputs—two NO inputs are monitored.
    Any time there is a change in state (from that logically configured) an event is created, time/date stamped and stored in memory.
    Inputs can be logically configured.
    Functionally tied together or operated separately.
    Respond in <500 ms
    Ignore transitions repeating in less than 750 ms.
    Can be turned on or off independently.
    Have their action delayed by resettable timers.
2. Outputs—two independent form C outputs are driven.
    Outputs can be logically configured for transition state.
    Measured for current flowing regardless of contact position.
    Tested continuously looking for a state change in current flow.
    Are able to be turned off with respect to reaction from inputs.
3. Temperature sensors—Reads 6 temperature sensors on a 1-wire serial bus.
    Each sensor has its own unique address.
    Unused sensors are ID'd as 00
    Sensors are monitored constantly during Test and Operation modes.
    Temperatures are captured at the default rate of every hour as an Event.
    Data are captured as a special "Event" if set limits are exceeded.
    Sensors are fault tested and reported by exception.
    Sensor replacement requires sending a "replace" code and reconfiguration
    Are read in a round-robin format.
    Are stored in degrees C.
4. Measurements—measure output current flow and voltage at power input.
    Measure and store the relative current levels in the output path of both output relay commons.
    Compares measurement to set values.
    Gets stored as part of a record
    Controls relay action based on set criteria.
    Measure and store relative voltage levels as compared to nominal supply voltage level.
    Differentials between temperature sensors.
    Affected by input delay timers
    Remain in the state assigned continuously through the invoking event.
    On a power failure, returns to the last Event which caused it after running through the DOB timer, if set after the POR.
5. Bluetooth Communication—Binary based, serially communicates to/thru Bluetooth
    Can occur both periodically and randomly or when specifically requested by a query command.
    Will include passing Packet data to the BT module.
    Includes invoking and accepting AT-style command set for communication to the BT.
    Will pass unique serial numbers and ID numbers installed through configuration.
    Will facilitate and allow Data Reads, Configuration changes, and complete Flash Reprogramming of its embedded program SW when invoked using fault tolerant methods.
    Will include a DARM Ok handshaking with the BT.
6. RS 232 Communication—ASCII based, used for initial configuration and testing.
    Operational during normal operation when not transmitting via BT.
7. Re-programmability—Done via on-board connector or over the BT serial
8. Recording Events—types of events that get recorded:
    Temperature
        Exceeds threshold
        Taken at the regular interval
    Inputs
        State change
        Fault timer exceeded
        From an change of state
        DOM exceeded
        DOM exceeded
        DOM reset
        DOB reset
    Outputs
        Fault timer exceeded
        Current flow change
        Passed current threshold
        Exceeded current differential
    Communication
        Communication attempt failed to receive an ACK
9. Delay Timers—affect when the action of an input change occurs
    Delay on Make
        Causes a delay of any input action until the timer expires
        Can be configured as resettable or non-resettable.
        Is tied to a minimum output state change if non-resettable and inputs reset.
    Delay on Break
        Causes a delay of any output change until the timer expires
        Is started after the DOM timer expires.
        Is retriggerable immediately if the input changes state after expiration
        Can be configured as resettable or non-resettable.
10. Real Time Clock
    Can be set by configuration
    24 hr format
11. Counters
    Keep a running total of specific events
    Are read out as parameters
    Can be individually reset
12. Combinational logic
    In-1 and In-2 can be configured as logical inputs assigned to one or both outputs
    Follow the four Boolean expressions.

The electronics portion utilizes input information from both internal and external sensors and processes the data based on a specific set of deterministic logic and preconfigured setup criteria. Inputs can be set to have a logical and combinatorial effect on the outputs, can be turned on or off and have a delayed response to openings or closings of inputs as such, for ease of timed egress without activation of energy savings if so set.

Temperature sensors monitor critical points in an HVAC system as shown in the diagram: compressor inlet and outlets, fan motors, plenum and returns, cold and hot water pipes, duct outlet and inlets and ambient room temperatures at varying locations allow for sampling and reporting of multiple criteria used to assess efficiency and determine energy waste levels.

Output-sensors in series with control currents from any type of calling device, measure the current-flow of the control current(s), and at the same time, control continuity of said current paths acting to intervene in the status quo of a typical operational sequence. If the combination of external sensors at the inputs, along with set threshold levels typical for ill-performing HVAC components, as previously listed, the invention will gather all pertinent data, report it and act to break the same current path of the calling device thus controlling its current flow and effectively stopping the device(s) being driven upstream preventing further wasting of consumed energy.

A software program controls the overall invention operation. By referencing limits and set points and stored time for delaying or actuation length, and using combinational logic or other trip and restore point data that is both stored on board for up to 10 yrs of events, and/or sent via an on-board radio transceiver to other like wireless devices, the invention can work remotely as an energy saving device and can also be networked therefore, allowing a plurality of devices running programs to gather and organize event data forming a subnet, as part of a larger energy control system.

Figure 3:
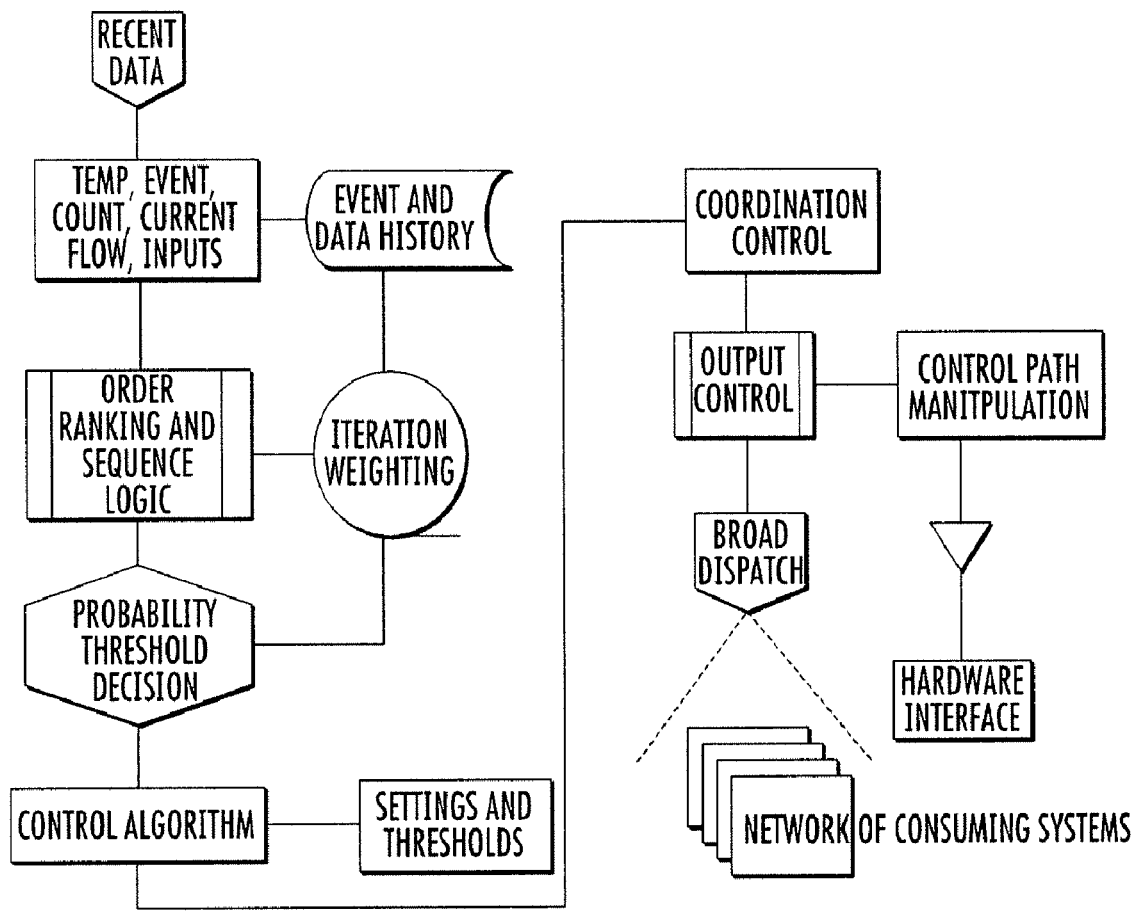
FIG. 3 is a process flow chart of one embodiment of the present invention.

FIG. 3 is a process flow chart of one embodiment of the present invention. The following is a description for each of the blocks shown.

Temp, Event, Count, Current flow, Inputs—Coming in from the various input connections or sensors built-in or from those otherwise tied to the invention's hardware inputs, This resulting data becomes the latest "sampling" information and is held as a new Event-Record. The data are stored chronologically in long-term memory and time-date-stamped.

Order, Ranking and Sequence Logic—as the previous blocks inputs change state, they are filtered for specific characteristics such as passing a threshold level, meeting a combinational-logic condition occurring in a particular sequence or exceeding some time duration previously established through settings made during initial configuration. Based on the configuration choices, values or options turned on or off sets up the criteria for which specific input(s) will be used to trigger an output event. Further, a weighting factor may be assigned to any selected inputs that will further influence the amount of change necessary to promulgate an output change. So based on such factors as repetition rate, duration or interval of said input's change, an outputs activity such as start-time, on duration, tie to another output or even ignoring action can be tailored. Ranking of which inputs will be the primary influence and which the tertiary, is orchestrated through a dynamic status ranking calculation using input activity placed through a programmable highpass fast averaging filter.

Probability Threshold decision—Depending on how often an input changes, for how long and at what interval, a probability decision can be extracted using Bayesian inference because fresh inputs are compared to past recorded actions and used to predict the direction of trend. This factor of what inputs are probably most consistently causing the output action can be used by applying a selected Iteration Weighting to the Control algorithm. So if it determined that temperature being set to a value is probably contributing to an output action, a change to the weighting factor would lessen the call for an output action proportional to a desired level of reduction. If it is determined that the probability of one certain inputs has changed, then the control algorithm will automatically be modified to affect that new input to be the one that is used to be tied to an outputs reduction the output.

Iteration Weighting—Is the control value that is set in the configuration to influence a level of output activity. It provides the amount in % that will influence the Control Algorithm for an output to be forced to work to. A damping factor is also involved for the for the sake of limiting runaway or oscillatory situations. So if a weighing factor of 2% is used, the input that is probably causing the output to be active will have its influence reduced so that the output is active 2% less than before.

In the course of meeting set points and checking for failures, the invention utilizes the predictive capabilities of the system to "find" likely places in the patterns of normal operation to "force" a level of energy savings by making slight adjustments to the normal operational characteristics of it. In other words, if a % of savings is desired, that % can be put back into the configuration of the invention and the method will find places to implement those changes. An outside software package is used to monitor overall trending then takes the data on system run times, durations, temperatures, and intervals, and evaluates and further adjusts the "gain" factors to effect energy savings through the same types of algorithmic manipulation techniques. A closed loop system is then created due to putting those tweaks back into the invention's control algorithm to continually refine the course of action to meet the desired result.

Control Algorithm—Gain-control for how the outputs will be influenced by the combination of weighing, preset values, thresholds, combinatorial and logical states, caused by the input actions that have occurred. So input 1 switch goes active, and exceeds the delay on make timers but is logically tied to input 2 and it is off, no output action will occur.

Coordination Control—Several like inventions can be in a network. One of the several can be a master and the rest are slaves from the standpoint of being controlled. The one that is called a master coordinates with each of the identified slaves through the Coordination control block in the master's program. So if an action occurs at a slave that is sent to the master on request from the master, the master can take action. Likewise the master can tell a slave to take action.

Output Control—Uses configuration settings with static addresses to the other networked devices so that they can be identified as being part of the network and also to reject other devices that are not identified as part of the network. Allows predicted actions to be conveyed to the other devices on the network. So if other networked like inventions were to form a web of devices, actions could be passed to the other inventions to produce a sequence of actions caused by the predictions of one through its use of Bayesian predictive methodology.

Broad Dispatch—Determines the level of devices in the network and whether any are masters. Takes in all security codes, serial numbers and security keys and validates them with an internal list set up during configuration.

Control Path Manipulation—Takes the programmed configuration settings, conditional and probability decisions caused by settings and Bayesian logic outcome and drives the user interface status indicators. So for instance, if an input occurs and exceeds the amount of time that input should be active, CPM directs the LEDs to perform a visual indication for the user.

The invention claimed is:

1. A method of monitoring and controlling an active environmental control system to impose energy efficient use of the system, the method comprising the steps of:
   monitoring a calling device for a change in calling data;
   time and date stamp the change in calling data;
   detecting a change in status of a plurality of physical sensors located within the system, wherein the state of each sensor represents a condition of the environment in which the system resides;
   time and date stamp the change in status of the plurality of physical sensors;

measuring the temperature of a plurality of temperature locations within the system;

time and date stamp the measured temperature of the temperature locations;

storing for an extended period the calling data, the status change of the physical sensors and the measured temperature of the plurality of temperature locations, together with the respective time and date stamp, in a memory of the system;

filtering the calling data, the physical sensors status change and the measured temperature for a system control trigger to identify system control trigger data;

extracting a probability decision, to predict a direction of trend, by comparing recent system control trigger data with prior recorded system control trigger data;

weighting the system control trigger data, based on the probability decision that the data is causing an output event trigger, in order to effect a desired change in output; and controlling the system based on the weighted system control trigger data.

2. The method of claim 1, wherein the step of monitoring the calling device further comprises the steps of:

measuring the current flow in an output of the calling device;

time and date stamp the measured current flow;

storing the measured current flow, together with the time and date stamp, in the memory of the system.

3. The method of claim 1, wherein the step of controlling the system includes controlling a control signal to a system load.

4. The method of claim 3, wherein the system load is selected from the group consisting of an HVAC compressor, heat pump, water valve controller, water valve solenoids, water valve actuators, gas valves, and steam valves.

5. The method of claim 1, wherein the step of controlling the system includes overriding the calling data of the calling device.

6. The method of claim 5, wherein the step of overriding includes interrupting the output current flow of the calling device.

7. The method of claim 1, wherein the calling device is a thermostat.

8. The method of claim 1, wherein the calling device provides a current flow.

9. The method of claim 1, wherein the physical sensors include at least one sensor which monitors the status of a door and at least one sensor which monitors the status of a window.

10. The method of claim 1, wherein the temperature locations include an air register, an air return input at a furnace, an air output at the furnace, a plenum of the furnace, a compressor, cold or hot liquid transfer pipe, and a condenser and air handler fans.

11. The method of claim 1, wherein the step of weighting includes setting a desired change in output defined by a percentage of increased energy efficiency.

12. The method of claim 1, wherein the step of detecting a change in status of a plurality of physical sensors located within the system includes receiving the change in status via a receiver.

13. The method of claim 1, wherein the step of measuring the temperature of a plurality of temperature locations includes measuring the temperature of a plurality of temperature locations via a one wire serial bus.

14. The method of claim 1, further comprising providing a BLUETOOTH® interface to a remote receiving device, and downloading data to the system via the remote receiving device.

15. The method of claim 1, further comprising the step of monitoring the quantity and level of environmental equipment usage in the context of community based independent living thus acting to protect the health/safety of an occupant, and tracking recording and reporting usage, duration, egress, levels and intervals, using predictive algorithms to determine a normal level of activity, predicting and acting on abnormal changes in activity.

16. The method of claim 1, in the context of proving the performance of existing or new building designs, wherein the steps of monitoring, detecting and measuring relate to a building, and wherein the step of extracting the probability decision, includes predicting a direction of trend related to testing energy related scenarios and to confirm energy reduction scenarios.

* * * * *